(12) United States Patent
Mizushima et al.

(10) Patent No.: US 8,807,756 B2
(45) Date of Patent: Aug. 19, 2014

(54) LASER PROJECTOR FOR REMOVING SPECKLE NOISE

(75) Inventors: Tetsuro Mizushima, Osaka (JP); Tatsuo Itoh, Osaka (JP); Akira Koruzuka, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 467 days.

(21) Appl. No.: 12/600,348

(22) PCT Filed: May 14, 2008

(86) PCT No.: PCT/JP2008/001202
§ 371 (c)(1),
(2), (4) Date: Nov. 16, 2009

(87) PCT Pub. No.: WO2008/142852
PCT Pub. Date: Nov. 27, 2008

(65) Prior Publication Data
US 2010/0165297 A1 Jul. 1, 2010

(30) Foreign Application Priority Data

May 18, 2007 (JP) ................. 2007-132497

(51) Int. Cl.
*G03B 21/00* (2006.01)
*G03B 3/00* (2006.01)
*H04N 9/31* (2006.01)
*G03B 21/14* (2006.01)
*G02B 26/08* (2006.01)
*G02B 27/09* (2006.01)
*G02B 27/48* (2006.01)

(52) U.S. Cl.
CPC ............... *G03B 21/00* (2013.01); *H04N 9/317* (2013.01); *H04N 9/3161* (2013.01); *H04N 9/3102* (2013.01); *G03B 21/14* (2013.01); *G02B 26/0875* (2013.01); *G02B 27/095* (2013.01); *G02B 27/48* (2013.01); *H04N 9/3197* (2013.01)
USPC ............................................ 353/31; 353/101

(58) Field of Classification Search
CPC .. G03B 21/005; G03B 21/006; G03B 21/008; G03B 21/12; G03B 21/13; G03B 21/132; G03B 21/14; G03B 21/142; G03B 21/145; G03B 21/147; G03B 21/2033; G03B 21/2066; G03B 21/28; G03B 21/00; H04N 9/31; H04N 9/3102; H04N 9/3105; H04N 9/3108; H04N 9/03
USPC ........... 353/30, 31, 100, 101, 122, 46, 48, 49, 353/82; 359/237, 245, 813, 814, 196.1, 359/197.1, 198.1, 201.1; 348/744, 750, 348/751, 756; 349/5, 78
See application file for complete search history.

(56) References Cited

U.S. PATENT DOCUMENTS

| 6,317,169 | B1 | 11/2001 | Smith | |
|---|---|---|---|---|
| 7,301,691 | B2 * | 11/2007 | O'Donnell | 359/291 |
| 7,611,249 | B2 * | 11/2009 | Kim | 353/101 |
| 7,972,020 | B2 * | 7/2011 | Bartlett et al. | 353/121 |
| 2006/0279713 | A1 * | 12/2006 | Wang et al. | 353/101 |
| 2008/0198334 | A1 | 8/2008 | Kasazumi et al. | |

FOREIGN PATENT DOCUMENTS

| JP | 2000-155373 | * | 6/2000 | ............ G03B 21/00 |
|---|---|---|---|---|
| JP | 2000-347291 | | 12/2000 | |
| JP | 2002-543455 | | 12/2002 | |
| JP | 2003-21806 | | 1/2003 | |
| JP | 2006-138939 | | 6/2006 | |
| JP | 2006-343464 | | 12/2006 | |
| WO | 2006/098281 | | 9/2006 | |

OTHER PUBLICATIONS

International Search Report issued Jun. 17, 2008 in International (PCT) Application No. PCT/JP2008/001202.

* cited by examiner

*Primary Examiner* — Pascal M Bui Pho
(74) *Attorney, Agent, or Firm* — Wenderoth, Lind & Ponack, L.L.P.

(57) ABSTRACT

A laser projector includes a laser light source; a two-dimensional light modulator which modulates light from the laser light source; and a projection optical system which projects images onto a display plane by expanding the light modulated by the two-dimensional light modulator. Shift of a display position of the two-dimensional light modulation element and shift of the projection optical system are performed in synchronization with each other so that display positions of the images on the display plane are made substantially identical to each other. Thereby, speckle noise is sufficiently removed, and high-grade images are displayed.

10 Claims, 11 Drawing Sheets

LASER PROJECTOR FOR REMOVING SPECKLE NOISE

BACKGROUND OF THE INVENTION

1. Technical Field

The present invention relates to a projector incorporated with a laser light source as a light source.

2. Background Art

A projector for displaying an image on a screen has been spread as an image display device. Generally, a lamp light source is used in the projector. However, the lamp light source has drawbacks that the life is short, the color reproducing range is limited, the volume of the light source is large, and the light use efficiency is low.

A laser light source has been attempted to be used as a light source in a projector to solve the above drawbacks. Since the laser light source has a long life and a strong directionality, as compared with a lamp light source, the light use efficiency of the laser light source can be easily enhanced. Further, since the laser light source has monochromaticity, the laser light source has a wide color reproducing range, and is capable of displaying a clear image. Furthermore, since the laser light source can be miniaturized, as compared with a conventional light source, and serves as a point light source, optical components of the laser light source can also be miniaturized. In view of these merits, the laser light source may be applicable to a portable projector, which has not been proposed in the conventional art.

In a projector (hereinafter, called as a laser projector) incorporated with a laser light source, however, speckle noise resulting from high coherence of laser light has become a problem. The speckle noise is a fine grain noise perceived by viewer's eyes, resulting from coherence between scattered light when the laser light is scattered on a screen. Randomly-arranged grains of a size determined by the F-number of the viewer's eyes and the wavelength of a laser light source are perceived as the speckle noise. The speckle noise obstructs the viewer from viewing an image on a screen, and causes serious image degradation.

Heretofore, there has been proposed an approach of controlling the beam angle by an optical system, as an approach of reducing speckle noise. For instance, patent literature 1 proposes pixelation and speckle noise reduction by oscillating a foldable mirror. Patent literature 2 proposes reducing scintillation (speckle noise) by oscillating an optical axis of a projection optical system in a very small angle range.

However, since the above proposals are made considering speckle noise reduction in a lamp light source, an angle change amount is small, and a sufficient speckle noise removal effect is not obtained, if the above proposals are applied to a laser light source.

Patent literature 3 proposes driving an element in a projection optical system to correct handshake of a portable projector. Patent literature 3, however, may fail to remove speckle noise under a condition including a case that image projection is performed in a state that a portable projector is fixed.

As described above, there are some proposals relating to speckle noise removal in a projector. However, none of the proposals provides a sufficient speckle noise removal effect in a laser projector, and the proposals fail to remove speckle noise, utilizing a two-dimensional light modulator.

Patent literature 1: JP (tokuhyo) 2002-543455A
Patent literature 2: JP 2003-21806A
Patent literature 3: JP 2006-138939A

SUMMARY OF THE INVENTION

In view of the above, it is an object of the present invention to provide a laser projector that enables to sufficiently remove speckle noise, and display high-grade images, using a laser light source, and a two-dimensional light modulator.

A laser projector according to an aspect of the invention includes a laser light source; a two-dimensional light modulator for modulating light from the laser light source; and a projection optical system for projecting images on a display plane by expanding the light modulated by the two-dimensional light modulator, wherein shift of a display position of the two-dimensional light modulator, and shift of at least a part of the projection optical system are performed in synchronization with each other so that display positions of the images on the display plane are made substantially identical to each other.

The above arrangement enables to sufficiently remove speckle noise, and display high-grade images, using the laser light source, and the two-dimensional light modulator.

DETAILED DESCRIPTION OF THE INVENTION

In the following, embodiments of the invention are described referring to the accompanying drawings.

(First Embodiment)

Figure 1:
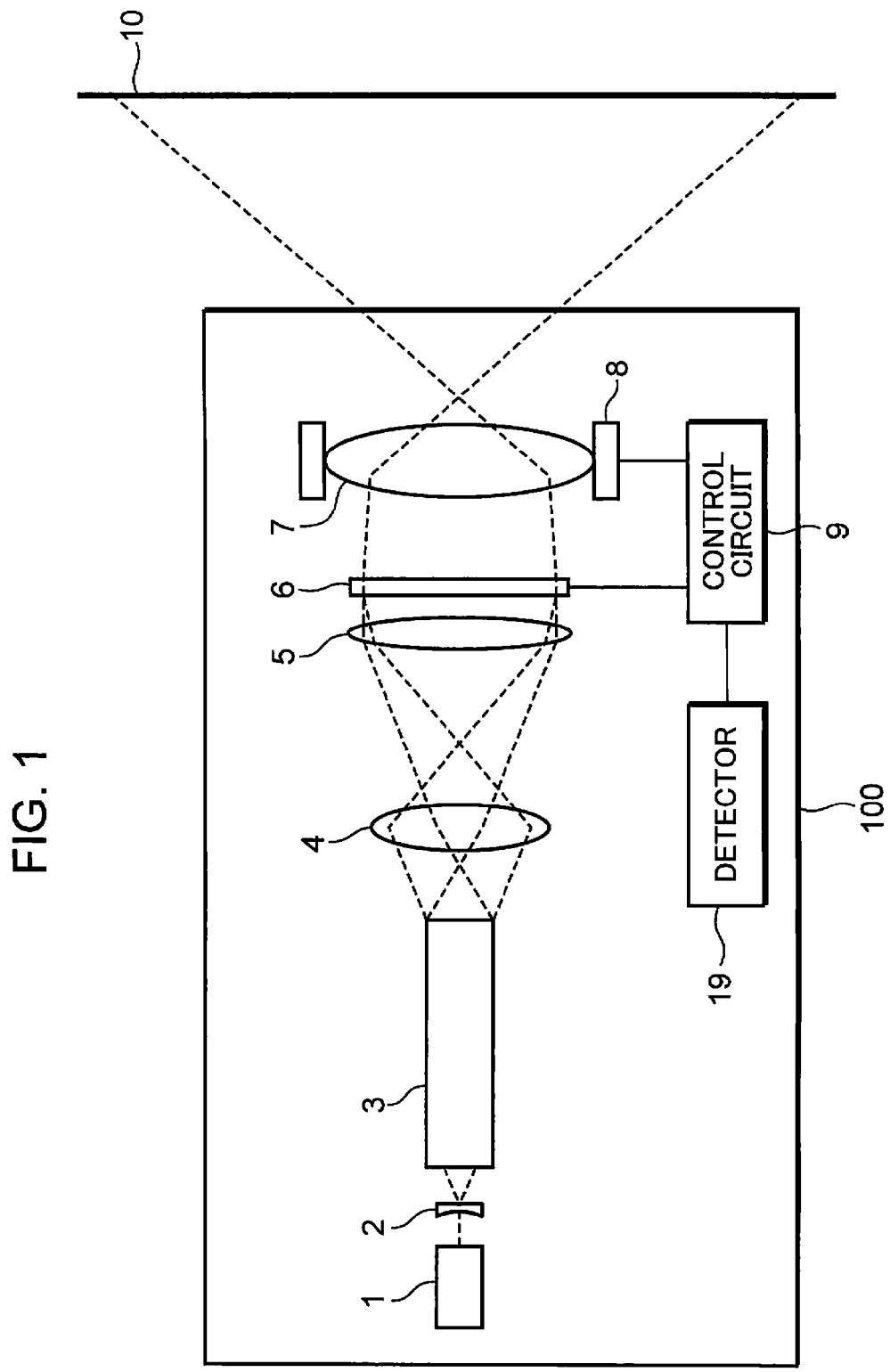
FIG. 1 is a schematic construction diagram of a laser projector in a first embodiment of the invention.

FIG. 1 is a schematic construction diagram of a laser projector 100 in the first embodiment of the invention. The laser projector 100 shown in FIG. 1 includes a laser light source 1, a lens 2, a rod integrator 3, a relay lens 4, a field lens 5, a two-dimensional light modulator 6, a projection optical system 7, a driver 8, and a control circuit 9.

Laser light emitted from the laser light source 1 is transmitted through the lens 2, subjected to beam shaping by the rod integrator 3, transmitted through the relay lens 4 and the field lens 5, and illuminates the two-dimensional light modulator 6. The two-dimensional light modulator 6 modulates the laser light in accordance with a video signal (a display signal) from the control circuit 9 to form an image. The projection optical system 7 enlarges and projects the image formed by the two-dimensional light modulator 6 on a display plane 10. In response to receiving a video signal from an external device, the control circuit 9 controls the two-dimensional light modulator 6 and the driver 8.

In performing the above operation, the projection optical system 7 is supported to be movable in a direction (upward and downward directions in FIG. 1) perpendicular to an optical axis by the driver 8; and the control circuit 9 shifts a display position of an image to be displayed by the two-dimensional light modulator 6, and shifts the projection optical system 7 in a direction (upward and downward directions in FIG. 1) perpendicular to the optical axis in synchronism with the shift of the display position.

In the laser projector 100, a transmissive two-dimensional light modulator is used as the two-dimensional light modulator 6. The display plane 10 is not specifically limited, and may be a member on which an image is projectable, such as a general screen, wall, or paper.

Figure 2:
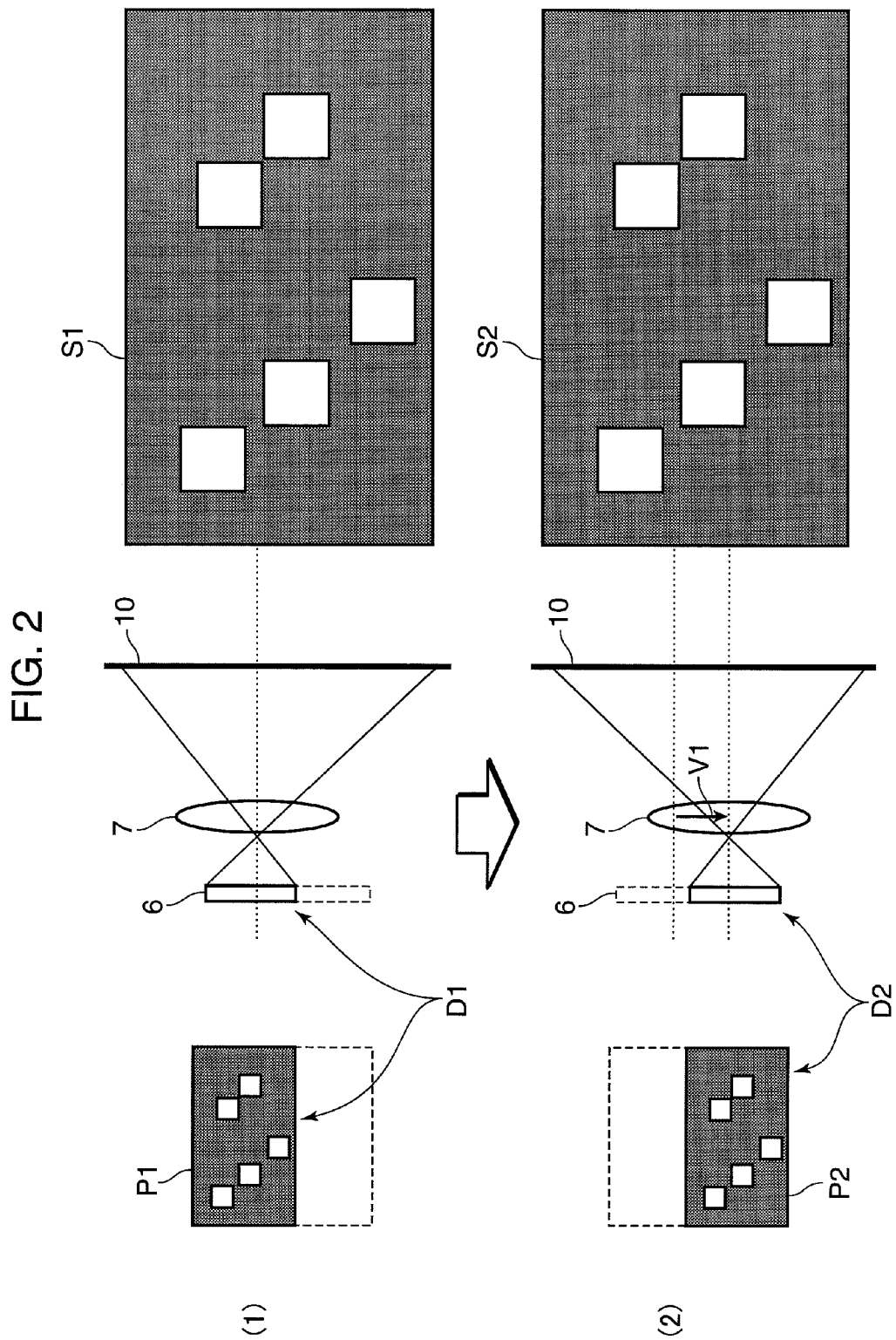
FIG. 2 is a schematic diagram for describing a display operation by the laser projector shown in FIG. 1.

FIG. 2 is a schematic diagram of a display operation by the laser projector 100 shown in FIG. 1. Referring to sections (1) and (2) in FIG. 2, from left to right, there are shown a display pattern P1, P2 of an image to be displayed on a display position D1, D2 of the two-dimensional light modulator 6; the display position D1, D2 of the two-dimensional light modulator 6 and a position of the projection optical system 7 with respect to the display plane 10; and a display pattern S1, S2 of an image to be displayed on the display plane 10. In FIG. 2, to simplify the illustration, the laser light source 1, the lens 2, the rod integrator 3, the relay lens 4 and the field lens 5 constituting an illumination optical system, the driver 8 for the projection optical system 7, and the control circuit 9 for controlling the driver 8 and the two-dimensional light modulator 6 shown in FIG. 1 are not illustrated.

When the laser projector 100 is in a state shown in the upper section (1) of FIG. 2, the control circuit 9 controls the two-dimensional light modulator 6 to display an image having the display pattern P1 corresponding to a video signal, using an upper-half pixel region of the two-dimensional light modulator 6 i.e. the display position D1 of the two-dimensional light modulator 6. Thereby, the projection optical system 7 enlarges and projects an image corresponding to an upper portion of the two-dimensional light modulator 6 on the display plane 10, and the image having the display pattern S1 is displayed on the display plane 10.

Then, when the laser projector 100 is in a state shown in the lower section (2) of FIG. 2, the control circuit 9 controls the driver 8 to shift the projection optical system 7 in the arrow direction V1, and then controls the two-dimensional light modulator 6 to display an image having the display pattern P2 identical to the display pattern P1 by switching a video signal, using a lower-half pixel region of the two-dimensional light modulator 6 i.e. the display position D2 of the two-dimensional light modulator 6. Thereby, the projection optical system 7 enlarges and projects an image corresponding to a lower portion of the two-dimensional light modulator 6 on the display plane 10, and the image having the display pattern S2 identical to the display pattern S1 is displayed at the same position as the image having the display pattern S1 on the display plane 10.

Then, to bring the laser projector 100 in the state as shown in the section (1) of FIG. 2, the control circuit 9 controls the driver 8 to shift the projection optical system 7 in a direction opposite to the arrow direction V1, and then controls the two-dimensional light modulator 6 to display an image having a succeeding display pattern, using the display position D1 corresponding to the upper portion of the two-dimensional light modulator 6. Thereby, the projection optical system 7 enlarges and projects an image corresponding to the upper portion of the two-dimensional light modulator 6 on the display plane 10, and the image having the succeeding display pattern is displayed on the display plane 10.

Then, to bring the laser projector 100 in the state as shown in the section (2) of FIG. 2, the control circuit 9 controls the driver 8 to shift the projection optical system 7 in the arrow direction V1, and then controls the two-dimensional light modulator 6 to display an image having a display pattern identical to the above display pattern, using the display position D2 corresponding to the lower portion of the two-dimensional light modulator 6. Thereby, the projection optical system 7 enlarges and projects an image corresponding to the lower portion of the two-dimensional light modulator 6 on the display plane 10, and the image having the display pattern identical to the above display pattern is displayed at the same position as the image having the above display pattern on the display plane 10.

As described above, the state shown in the section (1) and the state shown in the section (2) are alternately repeated, and the projection optical system 7 is operatively shifted in synchronism with shift of the display position of the two-dimensional light modulator 6 so that the display positions of images on the display plane 10 are made identical between the state shown in the section (1) and the state shown in the section (2). Thus, in this embodiment, lens shift of the projection optical system 7 in synchronism with shift of the display position of the two-dimensional light modulator 6 makes the display positions of images on the display plane 10 identical between the state shown in the section (1) and the state shown in the section (2).

As described above, in the laser projector 100, a display signal for shifting the display position of the two-dimensional light modulator 6 is switched in synchronism with a shift operation of the projection optical system 7 so that images represented by video signals are displayed at an identical pixel position on the display plane 10. For instance, referring to FIG. 2, the control circuit 9 shifts a same video signal in a vertical direction within the two-dimensional light modulator 6 by switching a delay signal in the vertical direction of the two-dimensional light modulator 6, thereby shifting the display position of the two-dimensional light modulator 6.

This embodiment is a preferred embodiment, wherein a display signal is electrically switched to shift the display position of the two-dimensional light modulator 6. For instance, switching a vertical delay signal and a horizontal delay signal enables to desirably select a portion to be displayed on the display plane 10 out of a usable display region within the two-dimensional light modulator 6. In performing the above operation, synchronizing an operation signal of the projection optical system 7 with a switching signal of a display signal facilitates a synchronizing operation of the projection optical system 7.

It is preferable to shift the display position of the two-dimensional light modulator 6 in the unit of several pixel arrays (preferably in the unit of one pixel array) of the two-dimensional light modulator 6 to smoothly perform a synchronizing operation of the projection optical system 7. Thereby, the display positions on the display plane 10 can be made identical to each other, while successively operating the projection optical system 7. This is advantageous in eliminating the need of creating a stationary state of the projection optical system 7, and preventing a pixel frame of the two-dimensional light modulator 6 from being displayed.

As described above, the laser projector 100 in this embodiment enables to make the display positions on the display plane 10 identical to each other by synchronizing shift of the display position of the two-dimensional light modulator 6 for modulating light from the laser light source 1, with a shift operation of the projection optical system 7. In this arrangement, the beam angle of a laser beam to be projected onto the display plane 10 can be greatly changed, with the display positions on the display plane 10 being identical to each other. This enables to generate speckle patterns without correlation by changing the speckle patterns on the display plane 10.

Observing a pixel to be displayed, one pixel of the display plane 10 is displayed, using plural pixels at different positions on the two-dimensional light modulator 6, by shifting the projection optical system 7. In performing this operation, the beam angles of beams, which are emitted from pixels at different positions on the two-dimensional light modulator 6 and impinge on the display plane 10, greatly differ from each other, and correlation between speckle patterns resulting from laser beams on the display plane 10 is lost. In this embodiment, superimposing speckle patterns without correlation enables to average speckle noises, thereby removing the speckle noises.

In the case where the beam angle is changed within the range of one pixel, the beam angle is changed only by a small amount, and correlation between speckle patterns may remain, with the result that speckle noise cannot be sufficiently removed. In this embodiment, using plural different pixels e.g. plural pixels spaced apart from each other by a distance corresponding to one pixel or more, enables to increase a beam angle change, thereby providing a sufficient speckle noise removal effect.

In the laser projector 100, the number of pixels usable within the two-dimensional light modulator 6 is set larger than the number of pixels to be displayed as one screen on the display plane 10, and an image to be displayed by using a part of the pixels of the two-dimensional light modulator 6 is displayed on the display plane 10. In this arrangement, desirably switching a portion to be displayed on the display plane 10 using the two-dimensional light modulator 6 enables to shift the display position within the two-dimensional light modulator 6. In view of this, in the example shown in FIG. 2, the display position is switched between the two patterns i.e. the upper and lower patterns. Alternatively, the display position may be successively and more finely shifted in the unit of several pixels to increase the number of patterns for switching the display position. In the modification, since the number of patterns for shifting the display position of the two-dimensional light modulator 6 can be increased, the number of speckle patterns to be averaged is increased, thereby further reducing speckle noise.

In the laser projector 100, pixels (e.g. the lower half pixels on the two-dimensional light modulator 6 in the state shown in the section (1) of FIG. 2, or the upper half pixels on the two-dimensional light modulator 6 in the state shown in the section (2) of FIG. 2) of the two-dimensional light modulator 6, which are not displayed on the display plane 10, are defined as a black display state, where light incidence is blocked. Thus, the pixels which are not displayed on the display plane 10 have a function of blocking incidence of stray light into the exterior of the frame of the display plane 10.

In the laser projector 100, there is used the two-dimensional light modulator 6 of a shape (e.g. a square shape) whose aspect ratio is smaller than the aspect ratio of a rectangle corresponding to an image region to be displayed on the display plane 10. This embodiment is a preferred example, wherein a rectangular region (having an aspect ratio of e.g. 16:9) is desirably selected from the two-dimensional light modulator 6 to shift the display position. The display plane 10 is preferably formed into a transversely elongated shape in the aspect of human engineering, and the lens system of the projection optical system 7 is preferably formed into a circular shape in the aspect of fabrication. In view of this, the lens in the projection optical system 7 has a larger latitude in the vertical direction of the display plane 10 than the horizontal direction of the display plane 10.

In this embodiment, a shift operation of the projection optical system 7 is performed. Preferably, the projection optical system 7 may be operated in the vertical direction of the display plane 10 having a larger latitude. The projection optical system 7 can be operated in the vertical direction of the display plane 10 by forming a display plane usable by the two-dimensional light modulator 6 into a shape whose aspect ratio is smaller than the aspect ratio of an image region to be displayed on the display plane 10; and by displacing the display position of the two-dimensional light modulator 6 in the vertical direction.

In the laser projector 100, the display positions on the display plane 10 are made identical to each other by shifting a lens in the projection optical system 7 in the in-plane direction of the lens. In this arrangement, the entirety of the projection optical system 7 may be shifted in the in-plane direction. Further alternatively, shifting a part of a lens group constituting the projection optical system 7 in the in-plane direction may also make the display positions on the display plane 10 identical to each other. Further alternatively, changing a tilt of an optical element in the projection optical system 7 to compensate for shift of the display position of the two-dimensional light modulator 6 may also make the display positions on the display plane 10 identical to each other. In other words, in the projection optical system 7 in this embodiment, shift control of the lens system in the in-plane direction, or tilt control of the optical element as described above may be performed in synchronism with shift of the display position of the two-dimensional light modulator 6.

(Second Embodiment)

Figure 3:
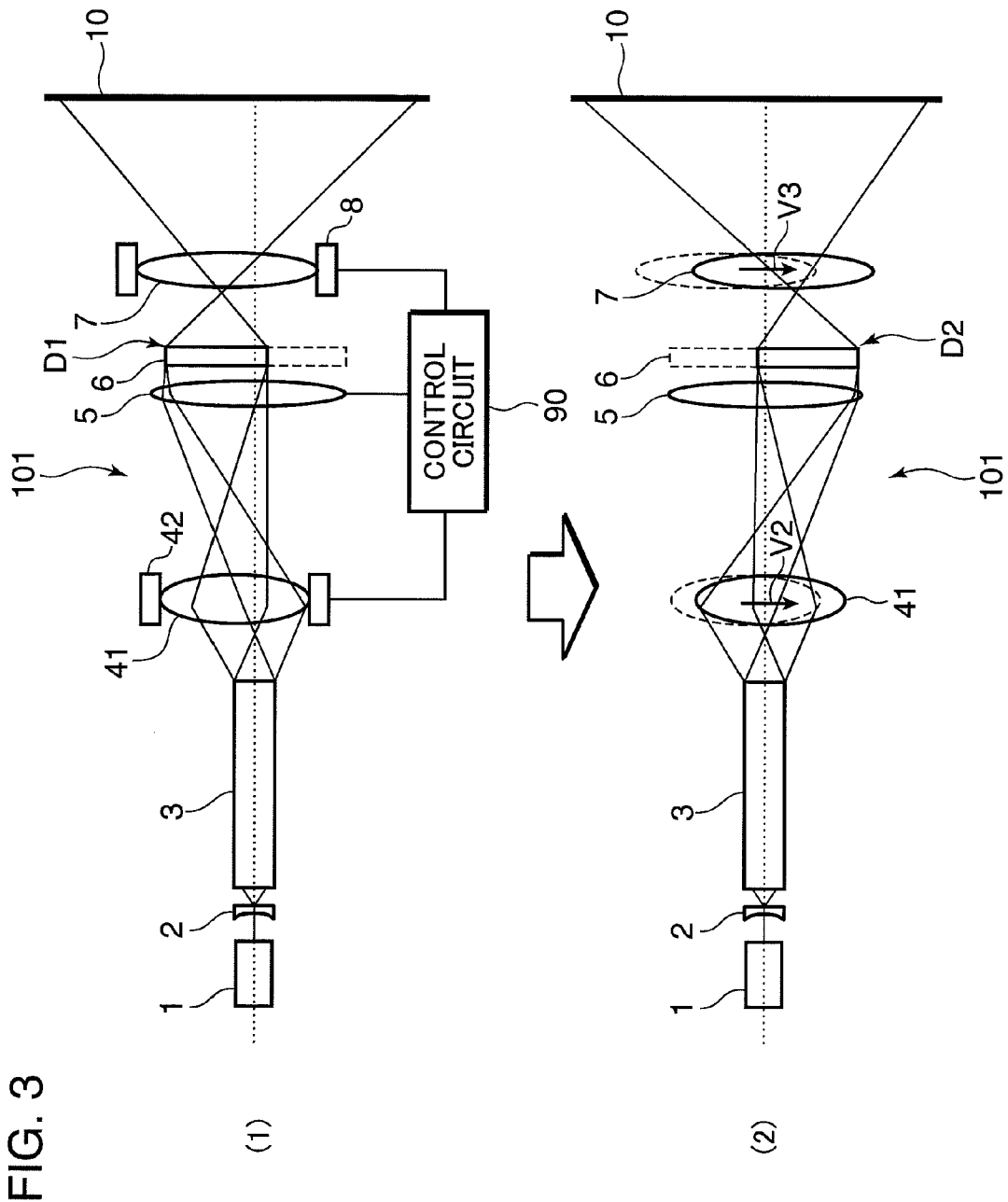
FIG. 3 is a schematic construction diagram of a laser projector in a second embodiment of the invention.

FIG. 3 is a schematic construction diagram of a laser projector 101 in the second embodiment, and shows a state that an illumination region of laser light is shifted in synchronism with shift of a display position D1, D2 of a two-dimensional light modulator 6 in the laser projector 101. In the section (2) of FIG. 3, to simplify the illustration, a driver 8 for a projection optical system 7, a driver 42 for a relay lens 41, and a control circuit 90 for controlling the drivers 8 and 42, and the two-dimensional light modulator 6 shown in the section (1) of FIG. 3 are not illustrated.

The second embodiment is different from the first embodiment in a point that the illumination region with respect to the two-dimensional light modulator 6 is also shifted in performing the display operation as shown in the sections (1) and (2) of FIG. 2. The shift operation of the illumination region is illustrated in FIG. 3. Specifically, the relay lens 41 is supported to be movable in a direction (upward or downward direction in FIG. 3) perpendicular to an optical axis by the driver 42. The control circuit 90 controls the driver 42 to shift the relay lens 41 in the direction (upward or downward direction in FIG. 3) perpendicular to the optical axis, controls the two-dimensional light modulator 6 to shift a display position of an image to be displayed by the two-dimensional light modulator 6, and controls the driver 8 to shift the projection optical system 7 in the direction (upward or downward direction in FIG. 3) perpendicular to the optical axis.

In the section (1) of FIG. 3, light emitted from a laser light source 1 is transmitted through a lens 2, subjected to beam shaping by a rod integrator 3, and incident into the relay lens 41. The relay lens 41 illuminates an upper portion of the two-dimensional light modulator 6 corresponding to the display position D1 with laser light. On the other hand, in the section (2) of FIG. 3, the control circuit 90 controls the driver 8 to shift the projection optical system 7 in the arrow direction V3, and controls the driver 42 to shift the relay lens 41 in the arrow direction V2. Thereafter, the display position of the two-dimensional light modulator 6 is switched from the display position D1 to the display position D2, whereby the relay lens 41 illuminates a lower portion of the two-dimensional light modulator 6 corresponding to the display position D2 with laser light.

As described above, in the example shown in FIG. 3, the relay lens 41 is shifted in the in-plane direction in synchronism with shift of the display position of the two-dimensional light modulator 6 to shift the illumination region with respect to the two-dimensional light modulator 6. Similarly to the operation of the projection optical system 7, the operation of the relay lens 41 is performed by a lens shift operation within a plane and simultaneously controlled by an identical mechanism. This embodiment is a preferred embodiment, wherein shift of an illumination region with respect to the two-dimensional light modulator 6, and an operation of the projection optical system 7 are simultaneously controllable by an identical mechanism.

As described above, in this embodiment, the illumination region of laser light for illuminating the two-dimensional light modulator 6 is shifted in synchronism with shift of the display position of the two-dimensional light modulator 6. This arrangement is a preferred embodiment, wherein the light use efficiency of laser light is enhanced by illuminating a region corresponding to a display position of the two-dimensional light modulator 6 with laser light. In the first embodiment, since the display position of the two-dimensional light modulator 6 is shifted, it is necessary to illuminate a wide region considering the shift, if the illumination region is set constant. This may lower the use efficiency of laser light. In this embodiment, however, the above drawback can be solved, and the use efficiency of laser light can be enhanced.

In FIG. 3, the illumination region is shifted by shifting the relay lens 41 in the in-plane direction. Alternatively, the illumination region may be shifted by tilt control of an optical element in the illumination optical system, or shift control of a beam shaping element in the in-plane direction. In the modification, similarly to FIG. 3, it is preferable to shift the illumination region by the same mechanism as the mechanism for operating the projection optical system 7. For instance, in the case where tilt control of an optical element in the projection optical system 7 is performed, tilt control of an optical element in the illumination optical system is also performed. The modification enables to easily perform synchronization control by using an identical mechanism.

In the foregoing embodiments, it is preferable to lower the output of the laser light source 1 at the time of switching the display position of the two-dimensional light modulator 6. For instance, lowering the output of the laser light source 1 by the control circuit 90 during a display signal switching period which is required at the time of switching the display position of the two-dimensional light modulator 6, or during a time required for a shift operation of the projection optical system 7, enables to prevent image noise or a portion corresponding to an afterimage, which may be generated at the time of switching operation, from being displayed on the display plane 10, and suppress electric power consumption of the laser light source 1.

The lowering amount of output of the laser light source 1 is set by e.g. suspending the output of the laser light source 1, or more preferably, by setting the emission power level of the laser light source 1 to one-tenth of the emission power level in normal display mode, or less. Setting the emission power level to one-tenth or less enables to reduce image noise which may be generated at the time of switching operation, and reduce electric power consumption of the laser light source 1, while stably oscillating the laser light source 1.

In the foregoing embodiments, it is preferable to provide a detector 19 shown in FIG. 1 for detecting a change in the position of the laser projector during a display operation. For instance, an acceleration sensor as a detector is attached to the laser projector, and the control circuit 90 controls the acceleration sensor to detect an acceleration of the laser projector to calculate a three-dimensional position of the laser projector by integrating the detected acceleration. The control circuit 90 detects a three-dimensional position change amount of the laser projector, based on the three-dimensional position of the laser projector, estimates a change amount of the display position of an image to be displayed on the display plane 10 corresponding to the detected position change amount, and controls the operation of shifting the display position of the two-dimensional light modulator 6 and the operation of shifting the projection optical system 7 so that the display positions of images to be displayed on the display plane 10 are made identical to each other by compensating for the change amount of the display position.

As described above, a change in the position of the laser projector is detected; and a synchronizing operation of the projection optical system 7 with the shift of the display position of the two-dimensional light modulator 6 is performed so that the display positions on the display plane 10 are made identical to each other, considering the change in the position of the laser projector. This enables to perform the synchronizing operation, even if the position of the laser projector is changed.

In the case where a fan or a speaker is attached to the laser projector, the position of the laser projector may vary resulting from e.g. oscillation. However, the synchronizing operation can be continuously performed by detecting a change in the position of the laser projector. In detecting a change in the position of the laser projector, a mechanism for detecting a displacement amount of a display position on the display plane 10 may be used. For instance, a camera for photographing the display plane 10 may be attached to the laser projector, and a displacement amount of a display position on the display plane 10 may be detected by detecting a displacement amount of the display position on the display plane 10 in a photographed image.

The two-dimensional light modulator in the foregoing embodiments is a transmissive liquid crystal panel. Alternatively, any one of a transmissive two-dimensional light modulator and a reflective two-dimensional light modulator may be used. Further alternatively, an LCOS or a DMD may be used.

In the foregoing embodiments, a beam shaping element constituted of a rod integrator, a relay lens, and a field lens are used as an optical system for illuminating a two-dimensional light modulator. The illumination optical system in this invention is not specifically limited to the above example, but other arrangement may be used, as long as the two-dimensional light modulator can be illuminated with light of a beam shape required for displaying an image on the two-dimensional light modulator, using light from the laser light source.

(Third and Fourth Embodiments)

A laser light source such as a semiconductor laser, a solid-state laser, or a wavelength conversion laser may be used as a laser light source in the invention. The laser projector 100 shown in FIG. 1 is an example of using a single laser light source. In the case where a color image is displayed by using three colors of R, G and B, laser light sources for emitting laser light of three colors of R, G, and B may be used. A color laser projector 200 in the third embodiment shown in FIG. 4, and a color laser projector 300 in the fourth embodiment shown in FIG. 5 are construction examples using laser light sources for emitting laser light of three colors of R, G, and B. The number of laser light sources is not specifically limited, and laser light sources for emitting laser light of four or more colors may be used.

Figure 4:
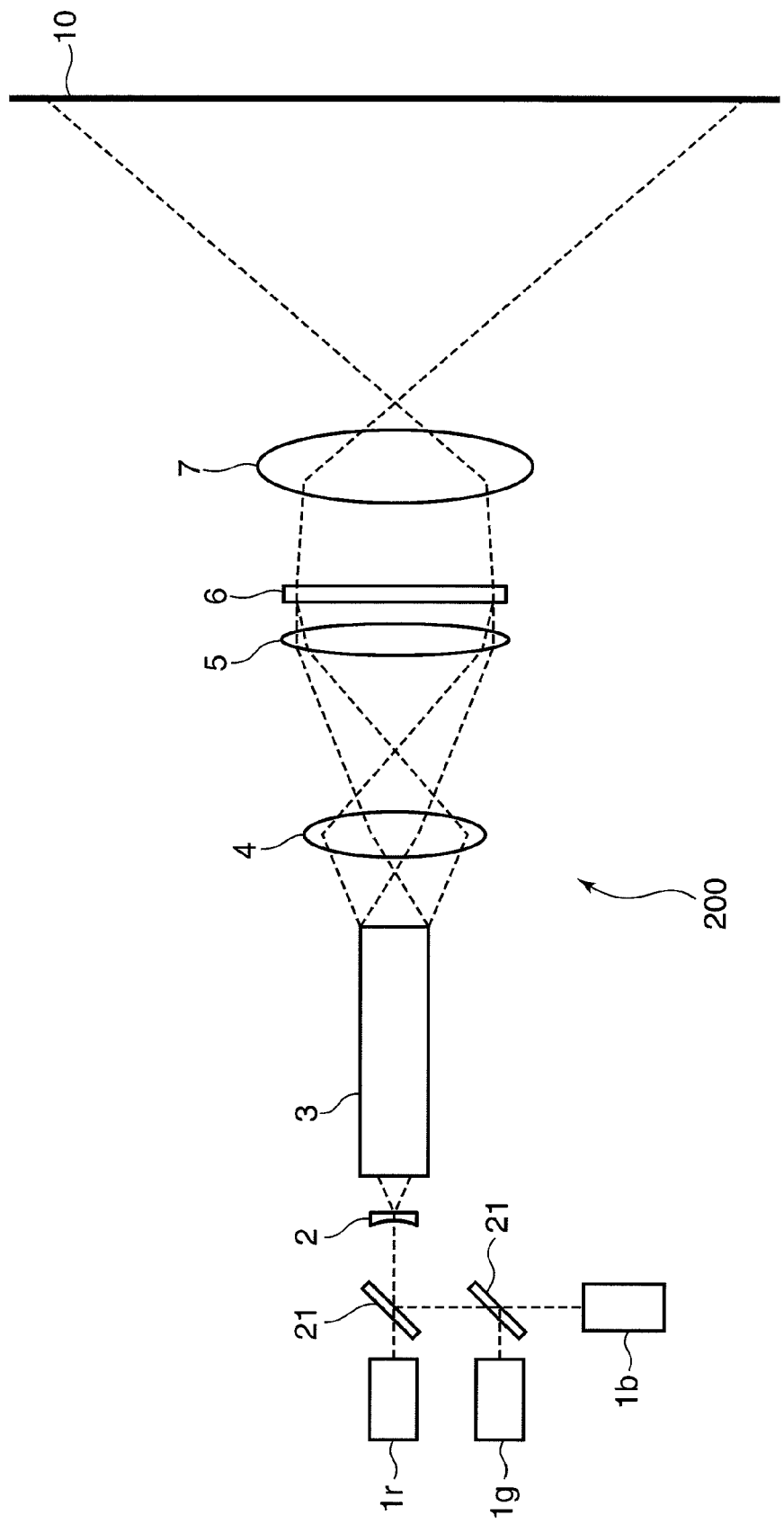
FIG. 4 is a schematic construction diagram of a color laser projector in a third embodiment of the invention.
Figure 5:
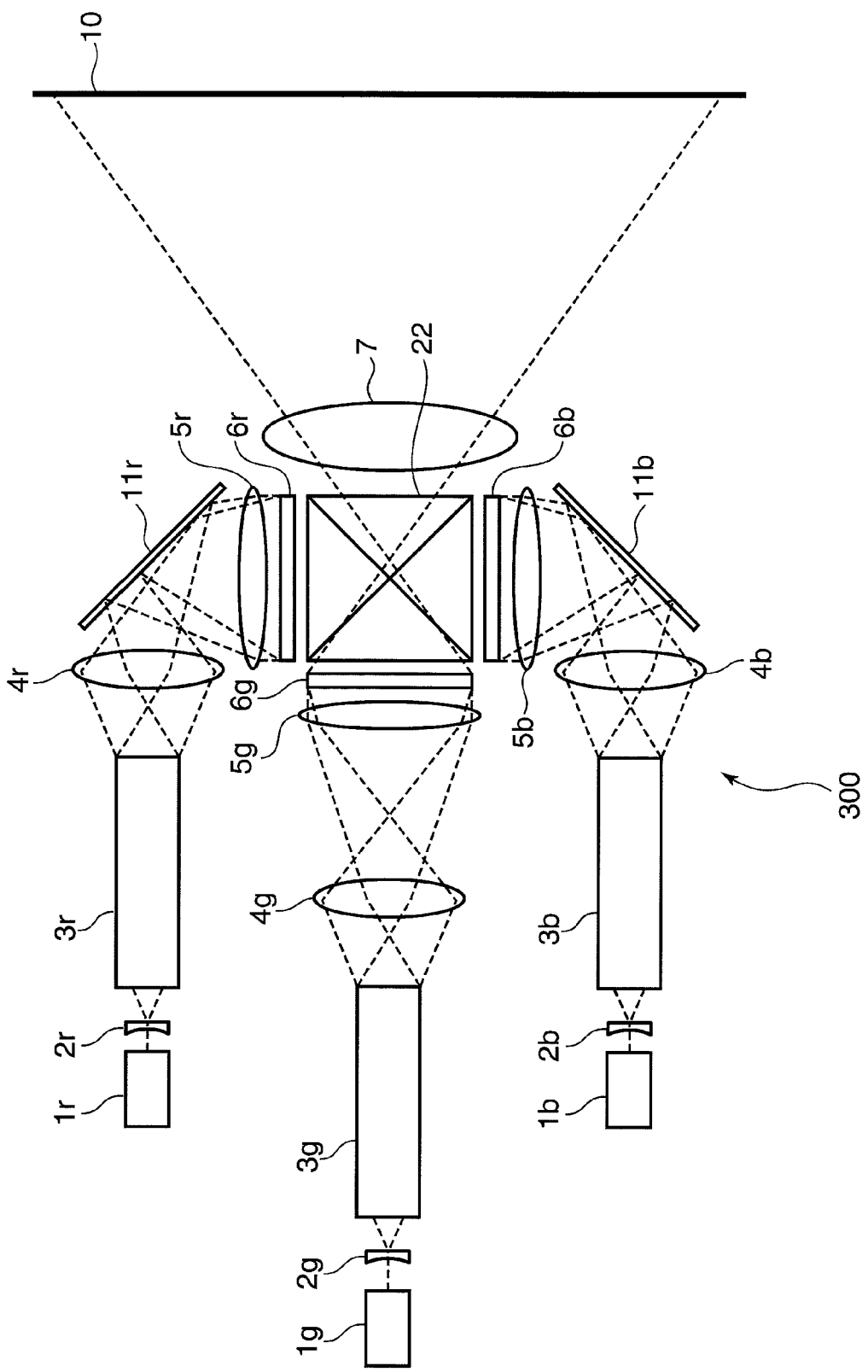
FIG. 5 is a schematic construction diagram of a color laser projector in a fourth embodiment of the invention.

FIG. 4 is a schematic construction diagram of the color laser projector 200 in the third embodiment of the invention. In FIG. 4, to simplify the illustration, a driver for a projection optical system 7, and a control circuit are not illustrated.

The laser projector 200 includes a red semiconductor laser 1r, a green wavelength conversion laser 1g, and a blue semiconductor laser 1g as laser light sources for emitting laser light of three colors. Light from the laser light sources is combined by a dichroic mirror 21, transmitted through a lens 2, and guided to a rod integrator 3 for beam shaping. The arrangement posterior to the rod integrator 3 is the same as the corresponding one in the laser projector 100.

In the laser projector 200, a two-dimensional light modulator 6 is subjected to time-division with respect to the colors of R, G, and B. The two-dimensional light modulator 6 modulates red laser light at a timing of emitting the red laser light from the red laser light source 1r, based on a video signal for displaying an image of red. Similarly, the two-dimensional light modulator 6 successively modulates green laser light and blue laser light at timings of emitting the laser light of the respective colors to form a color image. In this embodiment, shift of a display position of the two-dimensional light modulator 6, and an operation of the projection optical system 7 are performed in synchronization with each other so that the display positions of color images represented by display signals are made identical to each other on a display plane 10.

In the laser projector 200, it is preferable to perform a synchronizing operation of the projection optical system 7 with the shift of the display position of the two-dimensional light modulator 6 in accordance with the laser light emission order, at a timing of switching a laser light source for emitting laser light between the laser light sources 1r, 1g, and 1b. For instance, the display position of the two-dimensional light modulator 6 may be shifted each time the laser light source to be emitted is switched. Further alternatively, plural laser light sources (three laser light sources 1r, 1g, and 1b) may be defined as one set, and the display position may be switched one time each time a switching operation of laser light source is performed plural times (three times). In any of the modifications, the display position of the two-dimensional light modulator 6 is switched at a timing of switching a color of laser light to be emitted.

As described above, switching a display position of the two-dimensional light modulator 6 in accordance with a timing of switching laser light to be emitted enables to simultaneously perform an operation of switching a color signal, and an operation of switching a video signal for shifting the display position. Thereby, a display signal to be inputted to the two-dimensional light modulator 6 can be switched to shift the display position, without increasing the number of times of switching the display signal. This enables to reduce a load to a signal circuit within a control circuit.

FIG. 5 is a schematic construction diagram of the color laser projector 300 in the fourth embodiment of the invention. In FIG. 5, to simplify the illustration, a driver for a projection optical system 7, and a control circuit are not illustrated.

The laser projector 300 includes laser light sources 1r, 1g, and 1b for emitting laser light of three colors of R, and B, and two-dimensional light modulators 6r, 6g, and 6b corresponding to the three colors. The arrangements from the laser light sources 1r, 1g, and 1b to the two-dimensional light modulators 6r, 6g, and 6b are the same as the corresponding ones in the laser projector 100 except for a point that reflection mirrors 11r and 11b are added. Laser light of R, G, and B modulated by the two-dimensional light modulators 6r, 6g, and 6b is combined by a cross-prism 22, and enlarged and projected onto a display plane 10 by the projection optical system 7, as a spatially superimposed color image.

In the laser projector 300, display positions of the two-dimensional light modulators 6r, 6g, and 6b are shifted in synchronism with an operation of the projection optical system 7. For instance, display positions of all the two-dimensional light modulators 6r, 6g, and 6b are shifted in an upward direction on the plane of FIG. 5 (a direction from the rear side to the front side of the plane), out of the directions perpendicular to the plane; and the projection optical system 7 is synchronously operated in the upward direction on the plane, out of the directions perpendicular to the plane so that the display positions of color images on the display plane 10 are made identical to each other.

The shift directions of display positions of the two-dimensional light modulators 6r, 6g, and 6b, and the shift direction of the projection optical system 7 are not specifically limited to the above example. For instance, in the case where the display positions are shifted in a direction parallel to the plane of FIG. 5, since images of R, G, and B are transversely inverted, display positions of the two-dimensional light modulators 6r, 6g, and 6b are transversely shifted in opposite directions, with the two-dimensional light modulators 6r, 6g, and 6b being synchronized with each other, so that the display positions are shifted in a direction identical to the shift direction of the projection optical system 7.

(Fifth Embodiment)

Figure 6:
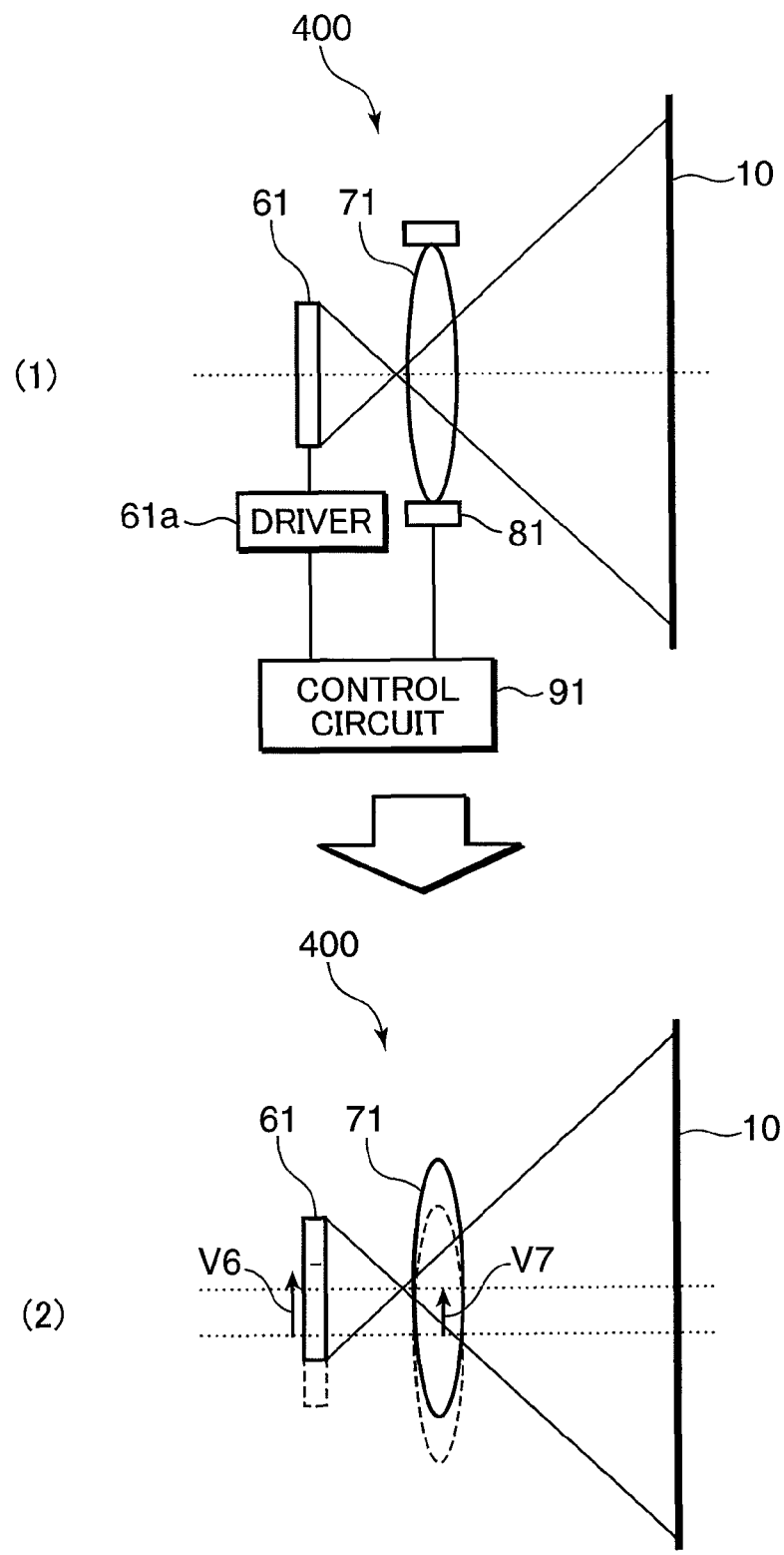
FIG. 6 is a schematic diagram for describing a display operation by a laser projector in a fifth embodiment of the invention.

FIG. 6 is a schematic diagram of a display operation by a laser projector 400 in the fifth embodiment of the invention. Since the arrangements of a laser light source and an illumination optical system in FIG. 6 are the same as the corresponding ones in the first embodiment, illustration thereof is omitted herein. In the section (2) of FIG. 6, to simplify the illustration, a driver 61a for a two-dimensional light modulator 61, a driver 81 for a projection optical system 71, and a control circuit 91 for controlling the drivers 61a and 81 shown in the section (1) of FIG. 6 are not illustrated.

The laser projector 400 shown in FIG. 6 includes the drivers 61a and 81 to be shifted in the same direction within a plane perpendicular to an optical axis in synchronism with the two-dimensional light modulator 61 and the projection optical system 71. The projection optical system 71 is supported to be movable in a direction (upward or downward direction in FIG. 6) perpendicular to the optical axis by the driver 81; and the two-dimensional light modulator 61 is supported to be movable in the direction (upward or downward direction in FIG. 6) perpendicular to the optical axis by the driver 61a. The control circuit 91 controls the driver 61a to shift the two-dimensional light modulator 61 in the direction (upward or downward direction in FIG. 6) perpendicular to the optical axis, and controls the driver 81 to shift the projection optical system 71 in the direction (upward or downward direction in FIG. 6) perpendicular to the optical axis in synchronism with the shift of the two-dimensional light modulator 61.

As described above, in the laser projector 400, the two-dimensional light modulator 61 itself is shifted in the in-plane direction of the two-dimensional light modulator 61 to shift the display position of the two-dimensional light modulator 61. Specifically, in the laser projector 400, the two-dimensional light modulator 61, and a part of a lens group constituting the projection optical system 71 are held on the drivers 61a and 81 constituted of a two-dimensional actuator, and synchronously controlled by an identical control mechanism. In this arrangement, the shift amplitude with respect to the center of the optical axis has a proportional relation so that the display positions on a display plane 10 are made identical to each other. For instance, in the section (2) of FIG. 6, the two-dimensional light modulator 61 and the projection optical system 71 are controlled to be synchronously shifted in the arrow directions V6 and V7 with respect to the positions of the two-dimensional light modulator 61 and the projection optical system 71 in the section (1) of FIG. 6 so that the display positions of images on the display plane 10 are made identical to each other.

This embodiment is a preferred embodiment, wherein the two-dimensional light modulator 61 and the projection optical system 71 are synchronously and physically shifted with each other. Specifically, in this embodiment, controlling the two-dimensional light modulator 61 and the projection optical system 71 to synchronously shift by an identical mechanism enables to easily realize an arrangement of removing speckle noise. The shift operations of the two-dimensional light modulator 61 and the projection optical system 71 may be performed in such a manner that the display positions of images on the display plane 10 do not completely coincide with each other, and a displacement corresponding to about one pixel may be allowed. Preferably, allowing a display position displacement within a range over 0 pixel to 0.5 pixel or less enables to prevent a pixel frame of each pixel of the two-dimensional light modulator 61 from being displayed on the display plane 10.

In the laser projector 400 of this embodiment, preferably, a shift width (a maximum shift width of a display position) of a shift mechanism for shifting the two-dimensional light modulator 61 is set to two times of the pixel pitch, or more. Shifting the display position by a distance corresponding to at least two times of the pixel pitch or more enables to lower the correlation between speckle noises, thereby providing a speckle noise reducing effect. For instance, in this embodiment, the shift width of the shift mechanism for shifting the two-dimensional light modulator 61 is set to twenty pixel pitches.

In the laser projector 400 of this embodiment, the shift direction of the two-dimensional light modulator 61 and the shift direction of the projection optical system 71 are identical to each other. In the case where a reflection component is interposed between the two-dimensional light modulator 61 and the projection optical system 71, the shift directions are different depending on a reflection angle. Similarly to the second embodiment, an arrangement of shifting an illumination region of the illumination optical system in synchronism with shift of the two-dimensional light modulator 61 may be provided in this embodiment.

(Sixth Embodiment)

Figure 7:
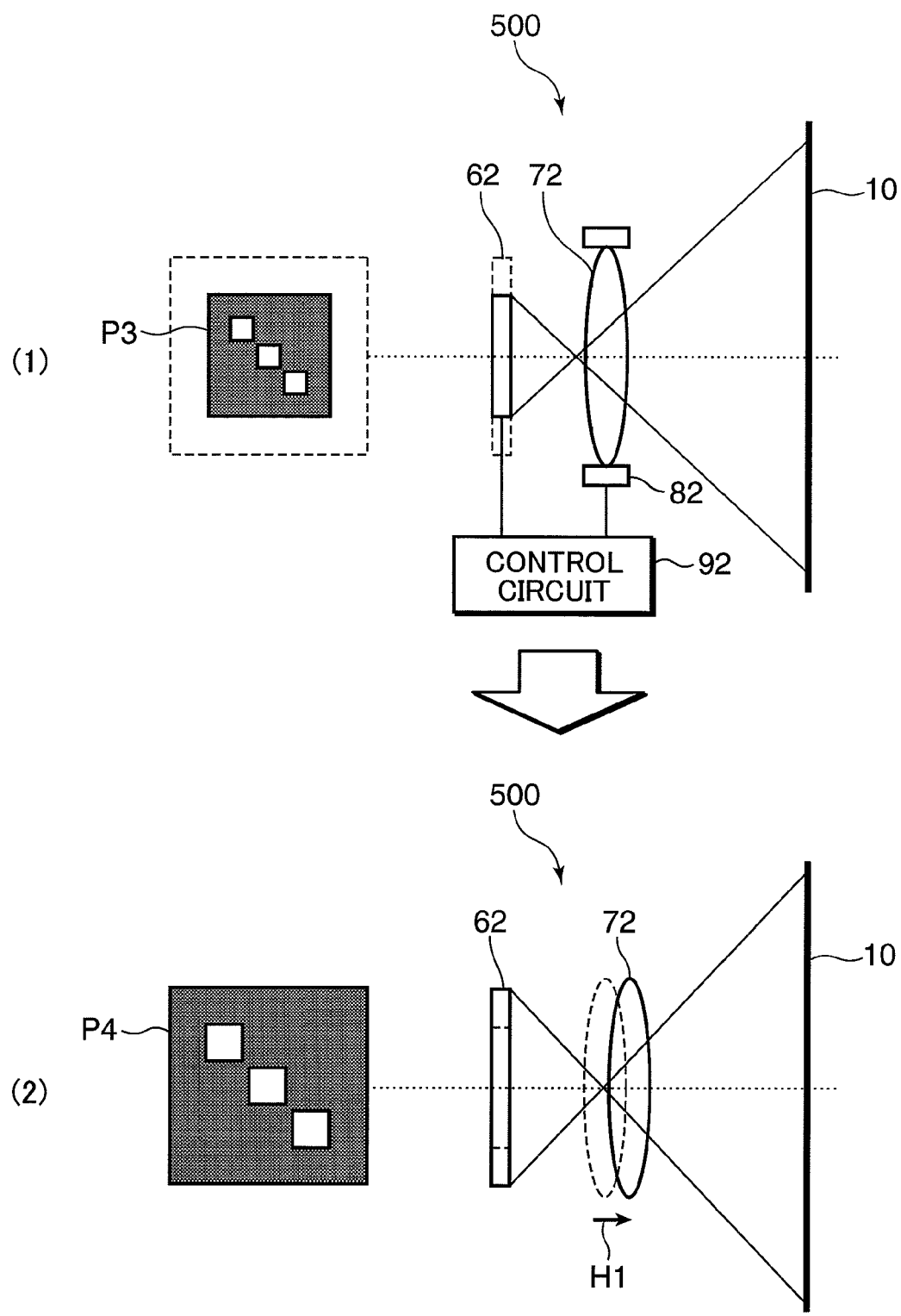
FIG. 7 is a schematic diagram for describing a display operation by a laser projector in a sixth embodiment of the invention.

FIG. 7 is a schematic diagram of a display operation by a laser projector 500 in the sixth embodiment. Since the arrangements of a laser light source and an illumination optical system in FIG. 7 are the same as the corresponding ones in the first embodiment, illustration thereof is omitted herein. In the section (2) of FIG. 7, to simplify the illustration, a driver 82 for a projection optical system 72, and a control circuit 92 for controlling a two-dimensional light modulator 62 and the driver 82 shown in the section (1) of FIG. 7 are not illustrated.

The laser projector 500 performs image resolution conversion, as necessary, and the control circuit 92 switches a display signal to be inputted to the two-dimensional light modulator 62. For instance, by switching a display signal, the two-dimensional light modulator 62 is operable to display a low resolution image having a display pattern P3, using pixels at a central portion of the two-dimensional light modulator 62 in the state shown in the section (1) of FIG. 7, and is operable to display a high resolution image having a display pattern P4, using pixels on the entirety of the two-dimensional light modulator 62 in the state shown in the section (2) of FIG. 7. Thus, the number of pixels to be used is switched with a relation between the sections (1) and (2) of FIG. 7.

The projection optical system 72 performs a zoom operation in synchronism with the operation of switching the number of pixels to be used (an area to be used) of the two-dimensional light modulator 62, and is controlled so that the display positions of images on a display plane 10 are made identical to each other. Specifically, in the state shown in the section (1) of FIG. 7, a low resolution image is displayed on the display plane 10, and in the state shown in the section (2) of FIG. 7, the projection optical system 72 is shifted in the arrow direction H1 to display a high resolution image on the display plane 10. These images are displayed with the same size and at the same position on the display plane 10.

A predetermined region on the display plane 10 is displayed with combination of different pixel numbers by switching the image resolution. For instance, an image obtained by integrating four patterns of images can be displayed on the predetermined region of the display plane 10, corresponding to four pixels, in a condition that image resolution switching is not performed, by switching the image resolution corresponding to the number of pixels of the two-dimension light modulator 62 to be used. The four patterns of images are an image to be displayed by using one pixel, an image to be displayed by using two pixels, an image to be displayed by using three pixels, and an image to be displayed by using four pixels. In this arrangement, in the case where the resolution conversion magnification is not a square of an integer, pixels are superimposedly displayed with displacement on the display plane 10.

The resolution conversion magnification in the specification means a magnification to be used in switching the number of pixels of the two-dimensional light modulator 62 to be used. For instance, in the case where the number of pixels to be used is switched to 2 or 4 from 1, the resolution conversion magnification becomes 2 or 4. Since 4 is a square of 2, the magnification of 4 corresponds to a magnification of a square of an integer. On the other hand, in the case where the resolution conversion magnification is not a square of an integer (a case that the number of pixels to be used is 2 or 3), the pixels are superimposedly displayed on the display plane 10 with displacement, as a result of time-integration.

In the case where a superimposed portion having a region smaller than the region corresponding to one pixel is subjected to time-integration on the display plane 10 in a condition that image resolution switching is not performed, a gradation can be imparted to a display image, because the pixels are superimposedly displayed with displacement. Thereby, the image resolution can be effectively raised. There is no need of controlling to display one pixel at a completely identical position on the display plane 10. In this embodiment, images based on video signals are controlled to be displayed at an identical position on the display plane 10.

This embodiment is a preferred embodiment, wherein the display position of the two-dimensional light modulator 62 is shifted by switching the resolution (the number of pixels to be used). Accordingly, in this embodiment, the effective image resolution can be raised, while removing speckle noise resulting from shift of the display position of the two-dimensional light modulator 62. Preferably, the image resolution conversion may be performed with respect to a magnification other than a square of an integer such as 4 or 9, in switching the image resolution.

The zoom operation of the projection optical system 72 is adjusting a lens magnification by displacing a part of a lens group constituting the projection optical system 72 in the optical axis direction, while adjusting the focus position on the display plane 10. The zoom operation of the projection optical system 72 may be performed by using a lens to be driven by an electrical signal, such as a liquid lens or a liquid crystal lens, in place of shifting a part of the lens group. The liquid lens or the liquid crystal lens is advantageous in changing the focus position by applying a voltage to the lens. Thus, a zoom operation or a shift operation of an optical system can be performed by controlling the voltage.

In view of the above, it is preferable to use a lens to be driven by an electrical signal in performing a zoom operation of the projection optical system. In this embodiment, the operation of the projection optical system is repeatedly performed. Use of a lens to be driven by an electrical signal enables to suppress electric power consumption and improve durability, without performing a mechanical operation. In the case where the display position of the two-dimensional light modulator 62 is shifted by switching a display signal, use of a lens to be driven by an electrical signal is advantageous in finely performing a synchronizing operation with a switching signal. As a result of this operation, shift of the display position of the two-dimensional light modulator 62, and a zoom operation of the projection optical system can be performed without degrading the image quality on the display plane 10, and the mechanism for operating the projection optical system can be miniaturized. A lens to be driven by an electrical signal may be used in a shift operation of the projection optical system in the other embodiments. The modification enables to obtain a similar effect as described above.

(Seventh Embodiment)

Figure 8:
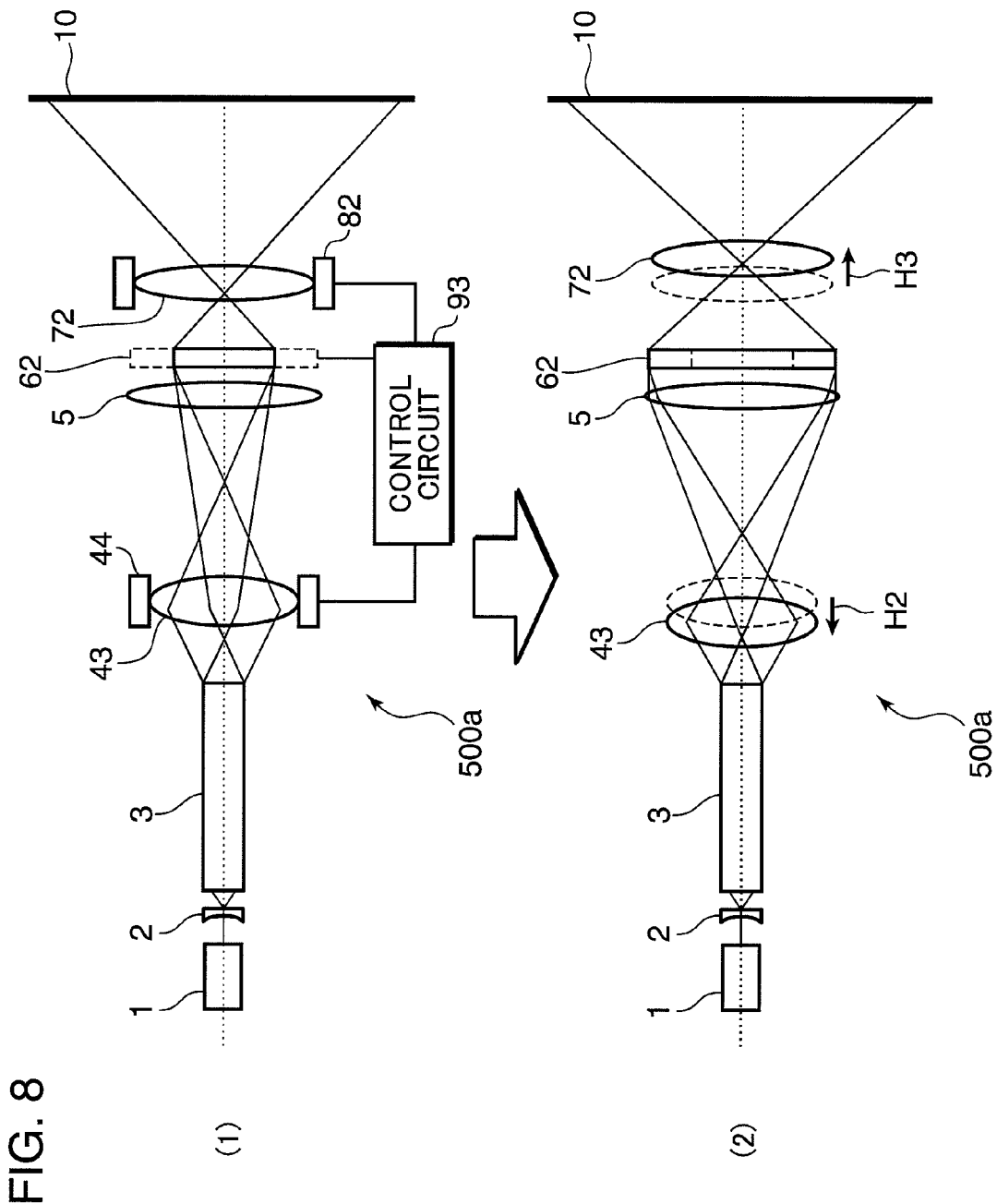
FIG. 8 is a schematic construction diagram of a laser projector in a seventh embodiment of the invention.

FIG. 8 is a diagram showing a state that an illumination region of laser light of a two-dimensional light modulator 62 is shifted in synchronism with an operation of switching a resolution of the two-dimensional light modulator 62 of a laser projector 500a in the seventh embodiment of the invention. In the section (2) of FIG. 8, to simplify the illustration, a driver 44 for a relay lens 43, a driver 82 for a projection optical system 72, and a control circuit 93 for controlling the two-dimensional light modulator 62, and the drivers 44 and 82 shown in the section (1) of FIG. 8 are not illustrated.

The seventh embodiment is different from the sixth embodiment in a point that the illumination region with respect to the two-dimensional light modulator 62 is also shifted in performing the display operation shown in the sections (1) and (2) of FIG. 7. The shift of the illumination region is shown in FIG. 8. Similarly to the display operation shown in the sections (1) and (2) of FIG. 7, the image resolution shown in the section (2) of FIG. 8 is raised, as compared with the section (1) of FIG. 8, and the number of pixels to be used (an area to be used) of the two-dimensional light modulator 62 is increased. The control circuit 93 controls the driver 44 to shift the relay lens 43 in the arrow direction H2 for a zoom operation in synchronism with the above operation to increase the illumination region. In FIG. 8, since the illumination region of laser light is switched, a part of a lens group constituting the relay lens 43 is shifted in the H2 direction for a zoom operation to switch the magnification of a shaped beam.

This embodiment is a preferred embodiment, wherein the light use efficiency of laser light is enhanced by shifting the illumination region of laser light in correspondence to a region corresponding to a display position of the two-dimensional light modulator 62. Since the display position of the two-dimensional light modulator 62 is shifted, it is necessary to illuminate a wide region considering the shift, if the illumination region is set constant. This may lower the use efficiency of laser light. In this embodiment, however, the above drawback can be solved. The embodiment shown in FIG. 8 is a preferred embodiment, wherein the mechanism for operating the projection optical system 72 and an illumination optical system is an identical zoom mechanism to facilitate synchronization control.

The zoom operation of the relay lens 43 in this embodiment may be performed by using a lens to be driven by an electrical signal, such as a liquid lens or a liquid crystal lens, other than a mechanism for physically shifting a lens. The lens to be driven by an electrical signal is advantageous in changing the focus position by applying a voltage to the lens. Thus, a zoom operation or a shift operation of a lens can be performed by controlling the voltage.

In view of the above, it is preferable to use a lens to be driven by an electrical signal in shifting the illumination region. In this embodiment, the operation of shifting the illumination region is repeatedly performed. Use of a lens to be driven by an electrical signal enables to suppress electric power consumption and improve durability, without performing a mechanical operation. In the case where the display position of the two-dimensional light modulator 62 is shifted by switching a display signal, use of a lens to be driven by an electrical signal is advantageous in finely performing a synchronizing operation with a switching signal, thereby strictly following the shift of the illumination region. As a result, a light amount loss resulting from shift of the illumination region can be suppressed.

(Eighth Embodiment)

Figure 9:
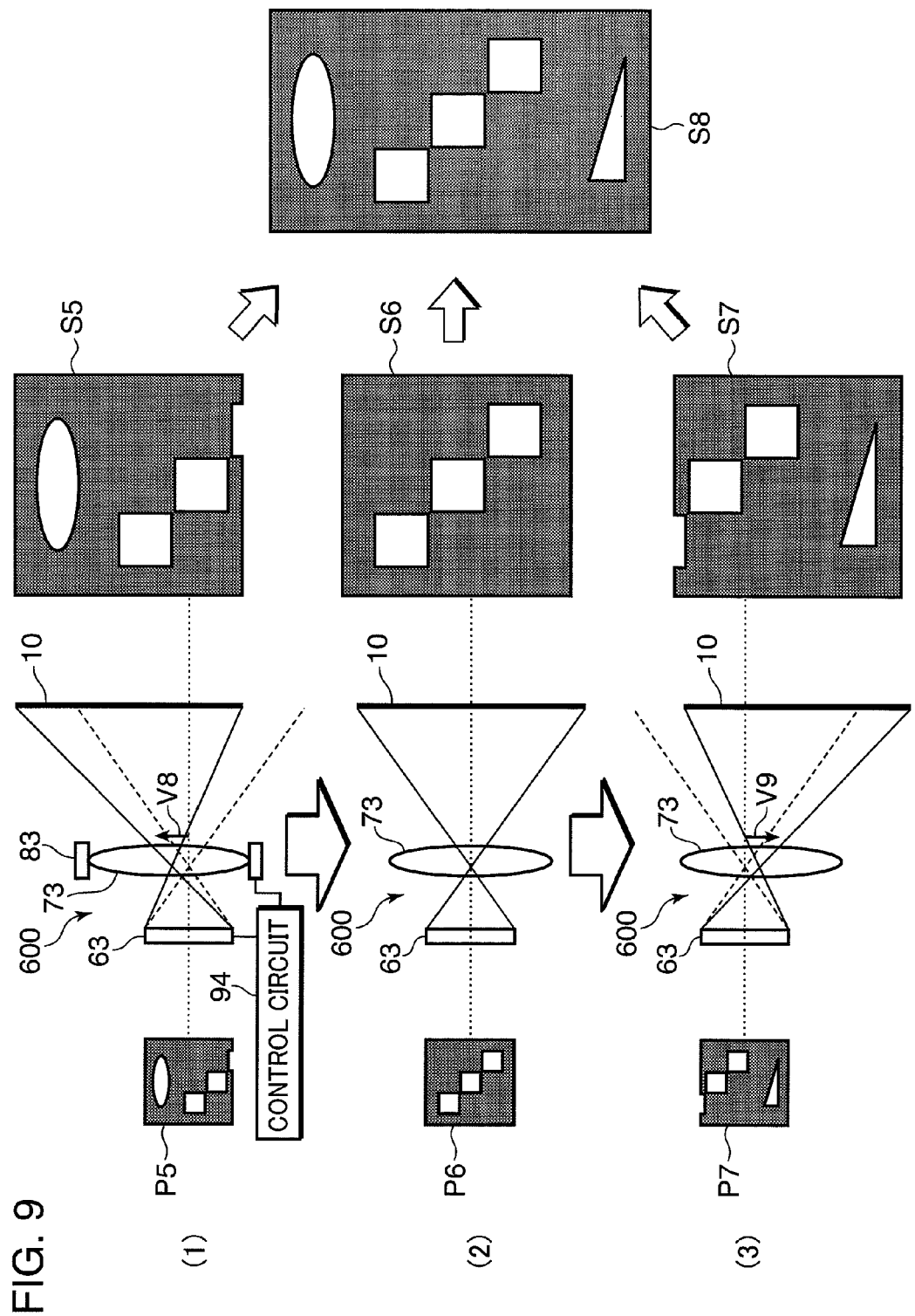
FIG. 9 is a schematic diagram for describing a display operation by a laser projector in an eighth embodiment of the invention.

FIG. 9 is a schematic diagram showing a display operation by a laser projector 600 in the eighth embodiment of the invention. Since the arrangements of a laser light source and an illumination optical system in FIG. 9 are the same as the corresponding ones in the first embodiment, illustration thereof is omitted herein. Further, in the sections (2) and (3) of FIG. 9, to simplify the illustration, a driver 83 for a projection optical system 73, and a control circuit 94 for controlling a two-dimensional light modulator 63 and the driver 83 shown in the section (1) of FIG. 9 are not illustrated.

In the laser projector 600, the control circuit 94 switches a display signal to shift a display position of the two-dimensional light modulator 63. For instance, the control circuit 94 switches a display signal in the order of a display pattern P5, a display pattern P6, and a display pattern P7 by switching a display state in the order of (1)→(2)→(3); and controls the driver 83 to shift the projection optical system 73 by a lens shift operation in the in-plane direction of a lens. In this arrangement, the position of the projection optical system 73 is controlled in such a manner that the display positions of images to be superimposed on a display plane 10, among the images to be displayed by the display pattern P5 shown in the section (1), the display pattern P6 shown in the section (2), and the display pattern P7 shown in the section (3), are made identical to each other.

Specifically, the projection optical system 73 is shifted in the arrow direction V8 to display the image having the display pattern S5 in the section (1) on an upper portion of the display plane 10. Then, the projection optical system 73 is returned to the central position to display the image having the display pattern S6 in the section (2) on a central portion of the display plane 10. Then, the projection optical system 73 is shifted in the arrow direction V9 to display the image having the display pattern S7 in the section (3) on a lower portion of the display plane 10. Performing an operation of switching a display signal to be inputted to the two-dimensional light modulator 63, and an operation of shifting the projection optical system 73 in the aforementioned manner enables to display an integrated display image S8 obtained by time-integration, on the display plane 10.

This embodiment is a preferred embodiment, wherein an integrated display area as the area of the integrated display image S8 is set larger than an instantaneous display area as the area of an instantaneous display image which is instantaneously displayed by the display pattern S5 in the section (1), or the area of an instantaneous display image which is instantaneously displayed by the display pattern S6 in the section (2), or the area of an instantaneous display image which is instantaneously displayed by the display pattern S7 in the section (3).

This embodiment enables to make a large screen for a laser projector, without image degradation such as image displacement, by controlling so that the display positions of images to be superimposed on the display plane 10 are identical to each other by a synchronizing operation of the projection optical system 73 with the shift of the display position of the two-dimensional light modulator 63. Further, this embodiment enables to remove speckle noise in a superimposed image.

FIG. 9 shows an example, wherein an integrated display image is enlarged in one direction (upward or downward direction in FIG. 9) to simplify the description. Alternatively, an integrated display image can be enlarged two-dimensionally by shifting the display position of the two-dimensional light modulator with the operation of the projection optical system in two axis directions (e.g. upward/downward direction and leftward/rightward direction in FIG. 9). Further alternatively, concerning the shift of the display position of the two-dimensional light modulator, and the operation of the projection optical system, similarly to the arrangements shown in the fifth and the sixth embodiments, an integrated display area can be increased by displacing images on the display plane. In the modification, control is performed in such a manner that the display positions of superimposed images are made identical to each other on the display plane.

This embodiment is a preferred embodiment, wherein the number of pixels of an integrated display image on the display plane 10 is set larger than the number of pixels of the two-dimensional light modulator 63. Specifically, superimposedly displaying the instantaneous display image having the display pattern S5 in the section (1), the instantaneous display image having the display pattern S6 in the section (2), and the instantaneous display image having the display pattern S7 in the section (3) with displacement on the display plane 10 enables to make the integrated display pixel number as the display pixel number of the integrated display image S8 obtained by time-integration larger than the pixel number of the two-dimensional light modulator 63. This arrangement enables to display a high resolution image on the display plane 10.

FIG. 9 is an example, wherein the integrated display pixel number is increased in one direction (upward or downward direction in FIG. 9) to simplify the description. Alternatively, the integrated display pixel number can be increased two-dimensionally by shifting the display position of the two-dimensional light modulator with the operation of the projection optical system in two axis directions (e.g. upward/downward direction and leftward/rightward direction in FIG. 9). Further alternatively, concerning the shift of the display position of the two-dimensional light modulator, and the operation of the projection optical system, similarly to the arrangement shown in the fifth embodiment, the integrated display pixel number may be increased by displacing images on the display plane. In the modification, control is performed in such a manner that the display positions of superimposed images are made identical to each other on the display plane. In the arrangement of the sixth embodiment, the effective integrated display pixel number can be made larger than the pixel number of the two-dimensional light modulator by displacing the pixel magnification of an image to be displayed from an integral multiple.

(Ninth Embodiment)

Figure 10:
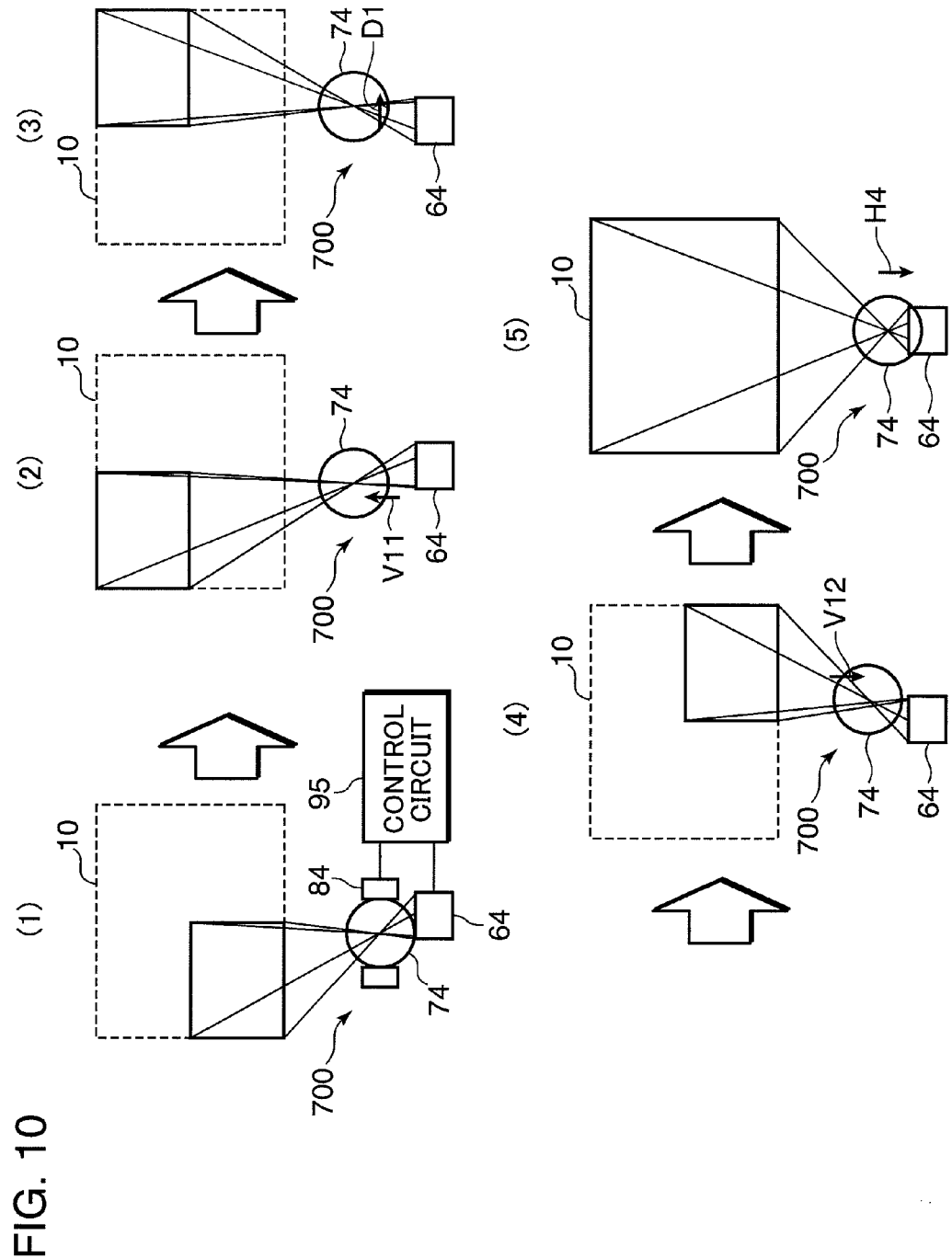
FIG. 10 is a schematic diagram for describing a display operation by a laser projector in a ninth embodiment of the invention.

FIG. 10 is a schematic diagram showing a display operation by a laser projector 700 in the ninth embodiment of the invention. Since the arrangements of a laser light source and an illumination optical system in FIG. 10 are the same as the corresponding ones in the first embodiment, illustration thereof is omitted herein. Further, in the sections (2) through (5) of FIG. 10, to simplify the illustration, a driver 84 for a projection optical system 74, and a control circuit 95 for controlling a two-dimensional light modulator 64 and the driver 84 shown in the section (1) of FIG. 10 are not illustrated.

In the laser projector 700, as shown in the sections (1) through (4) of FIG. 10, the control circuit 95 is operable to make the integrated display pixel number larger than the pixel number of the two-dimensional light modulator 64 by performing synchronization between an operation of switching a display signal to be inputted to the two-dimensional light modulator 64, and a lens shift operation of a projection optical system 74 in the arrow direction V11, D1, or V12. Further, as shown in the section (5) of FIG. 10, the control circuit 95 controls the driver 84 to drive the two-dimensional light modulator 64 and the projection optical system 74 by performing synchronization between an operation of switching an image resolution, and a zoom operation of the projection optical system 74 in the arrow direction H4 in such a manner that the position of an integrated display image to be displayed on a display plane 10 by the operations shown in the sections (1) through (4) of FIG. 10, and the position of an image to be displayed on the display plane 10 by the operation shown in the section (5) of FIG. 10 are made identical to each other.

In this embodiment, since the projection angle is changed by the operation shown in the section (5) of FIG. 10, while superimposing the display positions on the display plane 10, speckle noise can be removed, and the integrated display pixel number can be made larger than the pixel number of the two-dimensional light modulator 64 by the operations shown in the sections (1) through (4) of FIG. 10. This enables to increase the image resolution. Thus, this embodiment is an example, wherein synchronization between the shift of the display position of the two-dimensional light modulator 64, and the operation of the projection optical system 74 is performed by combination of (1)-(2)-(3)-(4)-(5) in FIG. 10.

This embodiment is also a preferred embodiment, wherein an operation of switching a display signal and an operation of switching an image resolution are combined to shift the display position of the two-dimensional light modulator 64. Combining these two operations enables to enhance the image resolution and remove speckle noise with respect to an entirety of the display plane, assuming that a plane where images are superimposed on the display plane 10 is defined as the entirety of the display plane.

Alternatively, shift of the display position of the two-dimensional light modulator is not specifically limited to the above example, but may be performed by combining the operation of shifting the two-dimensional light modulator described in the fifth embodiment, and the operation of switching the image resolution described in the sixth embodiment. The modification also enables to obtain a similar effect as described above.

(Tenth Embodiment)

Figure 11:
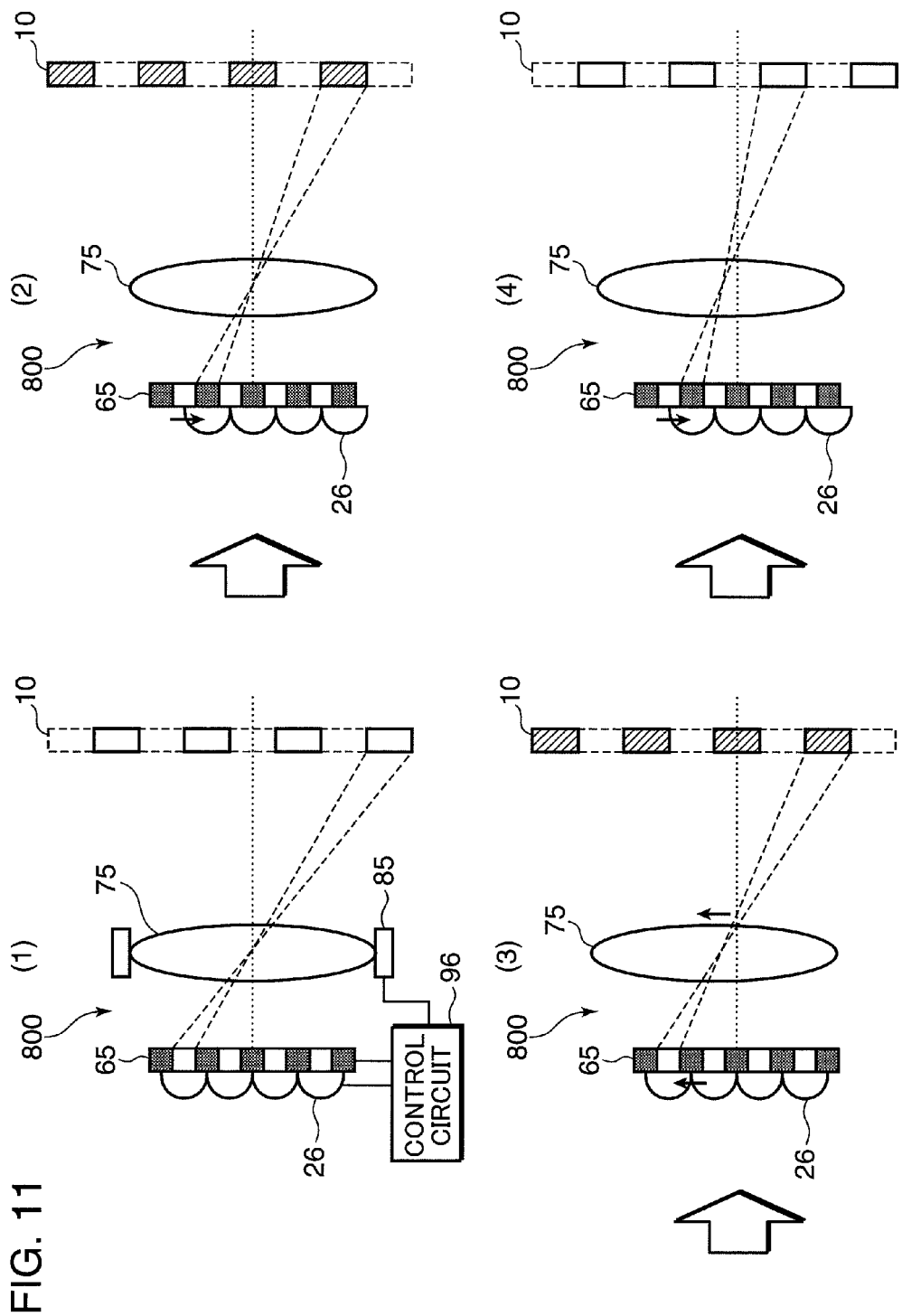
FIG. 11 is a schematic diagram for describing a display operation by a laser projector in a tenth embodiment of the invention.

FIG. 11 is a schematic diagram showing a display operation by a laser projector 800 in the tenth embodiment of the invention. Since the arrangements of a laser light source and an illumination optical system (except for a movable micro lens array 26) in FIG. 11 are the same as the corresponding ones in the first embodiment, illustration thereof is omitted herein. Further, in the sections (2) through (4) of FIG. 11, to simplify the illustration, a driver 85 for a projection optical system 75, and a control circuit 96 for controlling the movable micro lens array 26, a two-dimensional light modulator 65, and the driver 85 shown in the section (1) of FIG. 11 are not illustrated.

The laser projector 800 has the movable micro lens array 26, as a part of the illumination optical system, to shift an illumination region in accordance with shift of a display position of the two-dimensional light modulator 65. The movable micro lens array 26 is constituted of a micro lens array shown in FIG. 11, and a driver (not shown) for movably supporting the micro lens array. The movable micro lens array 26 selectively illuminates pixels to be used by the two-dimensional light modulator 65 for display by shifting the illumination region with respect to the two-dimensional light modulator 65.

For instance, in the laser projector 800, the movable micro lens array 26 is controlled by the control circuit 96 to perform a shift operation in upward or downward direction in FIG. 11 to selectively illuminate pixels (white pixels) indicated by white segments of the two-dimensional light modulator 65, and pixels (gray pixels) indicated by gray segments of the two-dimensional light modulator 65.

The display operation by the laser projector 800 is constituted of combination of (1)-(2)-(3)-(4) shown in FIG. 11. First, as shown in the section (1) of FIG. 11, the control circuit 96 transmits a display signal to the two-dimensional light modulator 65 to display the white pixels of the two-dimensional light modulator 65, whereby the pixels corresponding to the white pixels of the two-dimensional light modulator 65 are displayed at the positions indicated by the white segments of a display plane 10.

Then, as shown in the section (2) of FIG. 11, the control circuit 96 controls the movable micro lens array 26 to perform a shift operation (shift by a distance corresponding to one pixel in downward direction in FIG. 11), thereby allowing the movable micro lens array 26 to illuminate the gray pixels of the two-dimensional light modulator 65. In performing this operation, the control circuit 96 transmits a display signal to the two-dimensional light modulator 65 to display the gray pixels, whereby the pixels corresponding to the gray pixels of the two-dimensional light modulator 65 are displayed at the positions indicated by the hatched segments of the display plane 10.

Then, as shown in the section (3) of FIG. 11, the control circuit 96 controls the movable micro lens array 26 to perform a shift operation (shift by a distance corresponding to one pixel in upward direction in FIG. 11) and controls the projection optical system 75 to perform a shift operation (shift by a distance corresponding to one pixel in upward direction of FIG. 11) from the position shown in the section (2), thereby allowing the movable micro lens array 26 to illuminate the white pixels of the two-dimensional light modulator 65. In performing this operation, the control circuit 96 transmits a display signal for displaying the white pixels to the two-dimensional light modulator 65, whereby the pixels corresponding to the white pixels of the two-dimensional light modulator 65 are displayed at the positions indicated by the hatched segments of the display plane 10.

Then, as shown in the section (4) of FIG. 11, the control circuit 96 controls the movable micro lens array 26 to perform a shift operation (shift by a distance corresponding to one pixel in downward direction in FIG. 11) from the position shown in the section (3), thereby allowing the movable micro lens array 26 to illuminate the gray pixels of the two-dimensional light modulator 65. In performing this operation, the control circuit 96 transmits a display signal for displaying the gray pixels to the two-dimensional light modulator 65, whereby the pixels corresponding to the gray pixels of the two-dimensional light modulator 65 are displayed at the positions indicated by the white segments of the display plane 10.

In this embodiment, when the laser projector 800 is in the state corresponding to combination of the sections (1) and (4), and in the state corresponding to combination of the sections (2) and (3), the display position of the two-dimensional light modulator 65 is shifted between the white pixels and the gray pixels, and the projection optical system 75 performs a synchronizing operation so that the display positions on the display plane 10 are made identical to each other. In this way, this embodiment is a preferred embodiment, wherein the pixels of the two-dimensional light modulator 65 to be used for display are selectively illuminated in the unit of pixel arrays.

A high frame rate is required as compared with a conventional laser projector, and responsiveness of the two-dimensional light modulator 65 with respect to time is required to be increased in order to shift the display position. In this embodiment, selectively illuminating pixels to be used for display eliminates the need of responding to a display signal during a time when the pixels are not illuminated. This enables to use the two-dimensional light modulator 65 having a slow response speed. For instance, in the laser projector 800, an apparent response speed of the two-dimensional light modulator 65 can be increased by two times merely by switching display of white pixels between the state shown in the section (1) and the state shown in the section (3). This embodiment is also advantageous in solving a drawback that the use efficiency of laser light resulting from shift of the display position of the two-dimensional light modulator 65 may be lowered, because only the pixels to be used are illuminated.

The following is a summary of the embodiments of the invention. Specifically, a laser projector according to an aspect of the invention includes: a laser light source; a two-dimensional light modulator for modulating light from the laser light source; and a projection optical system for projecting images on a display plane by expanding the light modulated by the two-dimensional light modulator, wherein shift of a display position of the two-dimensional light modulator, and shift of at least a part of the projection optical system are performed in synchronization with each other so that display positions of the images on the display plane are made substantially identical to each other.

In the laser projector, since shift of the display position of the two-dimensional light modulator, and shift of at least the part of the projection optical system are performed in synchronization with each other so that the display positions of the images on the display plane are made substantially identical to each other, the angles of laser beams which impinge on the display plane greatly differ from each other, and correlation between speckle patterns resulting from the lasers beams, which may generate on the display plane, is lost. Superimposing speckle patterns without correlation enables to average speckle noises. Thus, speckle noise can be sufficiently removed, and high-grade images can be displayed by using the laser light source, and the two-dimensional light modulator.

Preferably, the two-dimensional light modulator may receive a display signal to be switched for shifting the display position of the two-dimensional light modulator to shift the display position in accordance with the display signal.

In the above arrangement, since the display position on the two-dimensional light modulator can be shifted by electrically switching the display signal, the display position of the two-dimensional light modulator can be shifted without physically shifting the two-dimensional light modulator itself.

Preferably, the two-dimensional light modulator may be physically shifted in synchronism with the shift of the projection optical system so that the display positions of the images on the display plane are made substantially identical to each other.

In the above arrangement, since the display position of the two-dimensional light modulator can be shifted by physically shifting the two-dimensional light modulator itself, the size of the two-dimensional light modulator can be minimized as necessary, and the laser projector can be made compact and lightweight.

Preferably, the two-dimensional light modulator may shift the display position in the unit of pixel arrays.

In the above arrangement, since the displays positions on the display plane can be made identical to each other, while successively shifting the projection optical system, there is no need of creating a stationary state of the projection optical system, and a pixel frame of the two-dimensional light modulator is prevented from being displayed.

Preferably, the two-dimensional light modulator may receive a display signal to be switched for converting a resolution of an image to be displayed by the two-dimensional light modulator to shift the display position by switching the resolution of the image in accordance with the display signal, and the projection optical system may perform a zoom operation in synchronism with the operation of switching the resolution of the two-dimensional light modulator.

In the above arrangement, since the zoom operation of the projection optical system is performed in synchronism with the operation of switching the resolution of the two-dimensional light modulator, the effective image resolution can be enhanced, while removing speckle noise resulting from shift of the display position of the two-dimensional light modulator.

Preferably, the laser projector may further include an illumination optical system for illuminating the two-dimensional light modulator by guiding the light from the laser light source to the two-dimensional light modulator, wherein the illumination optical system shifts an illumination region with respect to the two-dimensional light modulator in synchronism with the shift of the display position of the two-dimensional light modulator.

In the above arrangement, since a region corresponding to the display position of the two-dimensional light modulator can be illuminated with laser light, as the illumination region, the light use efficiency of laser light can be enhanced.

Preferably, an area of an integrated display image to be obtained by time-integrating the images to be displayed on the display plane may be set larger than an area of an instantaneous display image to be instantaneously displayed each time the display position of the two-dimensional light modulator is shifted.

In the above arrangement, since the integrated display image is displayed by controlling so that the display positions of the instantaneous display images to be superimposed on the display plane are made identical to each other, a large screen can be secured for the laser projector, without generating image degradation such as image displacement, and since plural instantaneous display images can be superimposed one over the other, speckle noise can be sufficiently removed.

Preferably, the number of pixels of an integrated display image to be obtained by time-integrating the images to be displayed on the display plane may be set larger than the number of pixels of the two-dimensional light modulator.

In the above arrangement, since the number of pixels of the integrated display image to be obtained by time-integrating the images to be displayed on the display plane is set larger than the number of pixels of the two-dimensional light modulator, a high resolution image can be displayed on the display plane.

Preferably, an output of the laser light source may be lowered at the time of switching the display position of the two-dimensional light modulator.

The above arrangement enables to prevent image noise or a portion corresponding to an afterimage, which may be generated at the time of switching operation, from being displayed on the display plane, and suppress electric power consumption of the laser light source.

Preferably, the laser projector may further include a detector for detecting a change in a position of the laser projector during a display operation, wherein the shift of the display position of the two-dimensional light modulator, and the shift of at least the part of the projection optical system are performed in synchronization with each other so that display positions of the images on the display plane are made substantially identical to each other by compensating for the change in the position detected by the detector.

In the above arrangement, since the shift of the display position of the two-dimensional light modulator, and the shift of the projection optical system are performed in synchronization with each other so that the display positions of the images on the display plane are made substantially identical to each other by compensating for the detected change in the position, high-grade images free of speckle noise can be displayed, the image resolution can be enhanced, and the display area can be expanded, without depending on whether the laser projector is fixed or vibrated.

Since the inventive laser projector enables to sufficiently remove speckle noise, and display high-grade images by using a laser light source, and a two-dimensional light modulator, the inventive laser projector can be utilized as a laser projector for displaying images using a laser light source.

The invention claimed is:
1. A laser projector, comprising:
a laser light source;
a two-dimensional light modulator for modulating light from the laser light source;

a projection optical system for projecting images on a display plane by expanding the light modulated by the two-dimensional light modulator;

a driver which shifts the projection optical system in a direction perpendicular to an optical axis of the light modulated by the two-dimensional light modulator or in a direction of the optical axis; and a controller which controls the two-dimensional light modulator and the driver, wherein the two-dimensional light modulator shifts a display position of an image in the two-dimensional light modulator, a shift of a display position of the two-dimensional light modulator, and a shift of at least a part of the projection optical system are performed in synchronization with each other so that display positions of the images on the display plane are made identical to each other when the display position of the image in the two-dimensional light modulator is shifted, and the controller controls the two-dimensional light modulator to change a pixel region of the two-dimensional light modulator, wherein each pixel of the display plane is displayed using a plurality of pixels spaced apart from each other by a distance corresponding to one pixel or more on the two-dimensional light modulator, and the controller controls the driver to shift the projection optical system in the direction perpendicular to the optical axis or in the direction of the optical axis in synchronism with the change of the pixel region of the two-dimensional light modulator.

2. The laser projector according to claim 1, wherein the shift of the display position of the image in the two-dimensional light modulator is such that the two-dimensional light modulator receives a display signal to be switched by shifting the display position of the two-dimensional light modulator to shift the display position of the image in the two-dimensional light modulator in accordance with the display signal.

3. The laser projector according to claim 1, wherein the shift of the display position of the image in the two-dimensional light modulator is such that the shift of the display position of the image in the two-dimensional light modulator is performed in a unit of pixel arrays.

4. The laser projector according to claim 1, wherein the shift of the display position of the image in the two-dimensional light modulator is such that the two-dimensional light modulator receives a display signal to be switched by converting a resolution of an image to be displayed by the two-dimensional light modulator to shift the display position by switching the resolution of the image in accordance with the display signal, and the projection optical system performs a zoom operation in synchronism with the operation of switching the resolution of the two-dimensional light modulator.

5. The laser projector according to claim 1, further comprising:

an illumination optical system for illuminating the two-dimensional light modulator by guiding the light from the laser light source to the two-dimensional light modulator, wherein the illumination optical system shifts an illumination region with respect to the two-dimensional light modulator in synchronism with the shift of the display position of the image in the two-dimensional light modulator.

6. The laser projector according to claim 1, wherein an area of an integrated display image obtained by time-integrating the images to be displayed on the display plane is set larger than an area of an instantaneous display image to be instantaneously displayed each time the display position of the image in the two-dimensional light modulator is shifted.

7. The laser projector according to claim 1, wherein the number of pixels of an integrated display image obtained by time-integrating the images to be displayed on the display plane is set larger than the number of pixels of the two-dimensional light modulator.

8. The laser projector according to claim 1, wherein an output of the laser light source is lowered at the time of switching the display position of the image in the two-dimensional light modulator.

9. The laser projector according to claim 1, further comprising:

a detector for detecting a change in a position of the laser projector during a display operation, wherein the shift of the display position of the image in the two-dimensional light modulator, and the shift of at least the part of the projection optical system are performed in synchronization with each other so that display positions of the images on the display plane are made substantially identical to each other by compensating for the change in the position detected by the detector.

10. A laser projector, comprising:

a laser light source;

a two-dimensional light modulator for modulating light from the laser light source;

a projection optical system for projecting images on a display plane by expanding the light modulated by the two-dimensional light modulator;

a first driver which shifts the two-dimensional light modulator in a direction perpendicular to an optical axis of the light modulated by the two-dimensional light modulator;

a second driver which shifts the projection optical system in the first direction or in a second direction parallel to the optical axis; and a controller which controls the two-dimensional light modulator, the first driver and the second driver, wherein the two-dimensional light modular shifts a display position of an image in the two-dimensional light modulator, a shift of a display position of the two-dimensional light modulator, and a shift of at least a part of the projection optical system are performed in synchronization with each other so that display positions of the images on the display plane are made identical to each other when the display position of the image in the two-dimensional light modulator is shifted, and the controller controls the first driver to shift the two-dimensional light modulator in the first direction by a distance corresponding to two times the pixel pitch or more, and controls the second driver to shift the projection optical system in the first direction or in the second direction in synchronism with the shift of the two-dimensional light modulator.

* * * * *